(12) United States Patent
Pan et al.

(10) Patent No.: US 11,086,638 B2
(45) Date of Patent: Aug. 10, 2021

(54) METHOD AND APPARATUS FOR LOADING APPLICATION

(71) Applicant: BAIDU ONLINE NETWORK TECHNOLOGY (BEIJING) CO., LTD., Beijing (CN)

(72) Inventors: Haijun Pan, Beijing (CN); Hua Zhou, Beijing (CN); Lian Duan, Beijing (CN); Qingxing Wang, Beijing (CN); Guohua Zhang, Beijing (CN); Hao Su, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/564,412

(22) PCT Filed: Jun. 17, 2016

(86) PCT No.: PCT/CN2016/086217
§ 371 (c)(1),
(2) Date: Oct. 4, 2017

(87) PCT Pub. No.: WO2017/107415
PCT Pub. Date: Jun. 29, 2017

(65) Prior Publication Data
US 2018/0329725 A1    Nov. 15, 2018

(30) Foreign Application Priority Data
Dec. 25, 2015  (CN) .......................... 201510994261.4

(51) Int. Cl.
*G06F 9/44*  (2018.01)
*G06F 9/445*  (2018.01)
(Continued)

(52) U.S. Cl.
CPC ............ *G06F 9/44557* (2013.01); *G06F 8/54* (2013.01); *G06F 9/44521* (2013.01);
(Continued)

(58) Field of Classification Search
CPC ........ G06F 11/30; G06F 11/36; G06F 11/362; G06F 11/3624; G06F 9/44557;
(Continued)

(56) References Cited

U.S. PATENT DOCUMENTS

| 5,379,398 A | 1/1995 | Cohn et al. |
| 5,581,768 A | 12/1996 | Garney et al. |

(Continued)

FOREIGN PATENT DOCUMENTS

| CN | 101246427 A | 8/2008 |
| CN | 101470619 A | 7/2009 |

(Continued)

OTHER PUBLICATIONS

Dong, et al., "Enabling efficient reprogramming through reduction of executable modules in networked embedded systems," d Hoc Networks 11, pp. 473-489 (2013).

(Continued)

*Primary Examiner* — Chat C Do
*Assistant Examiner* — Lenin Paulino
(74) *Attorney, Agent, or Firm* — Knobbe, Martens, Olson & Bear, LLP

(57) ABSTRACT

The present disclosure discloses a method and apparatus for loading an application. An embodiment of the method comprises: selecting, in a programmable read-only memory, a storage space for storing a preset data section in an executable file of an application; copying the preset data section to a memory, and relocating the preset data section based on a start address of the storage space; and copying the relocated preset data section to the storage space. A reloca- (Continued)

tion of a code portion of the executable file in the memory is implemented, and the relocated code portion is then written back into the programmable read-only memory, so that the relocation of the code portion can be completed only by one erase operation for a memory block, thereby reducing system overheads during the application loading process, and reducing wear of the programmable read-only memory.

7 Claims, 5 Drawing Sheets

(51) Int. Cl.
  *G06F 12/02* (2006.01)
  *G06F 8/54* (2018.01)
(52) U.S. Cl.
  CPC ...... *G06F 9/44578* (2013.01); *G06F 12/0246* (2013.01); *G06F 2212/2022* (2013.01); *G06F 2212/7211* (2013.01); *Y02D 10/00* (2018.01)
(58) Field of Classification Search
  CPC .... G06F 9/44521; G06F 9/44578; G06F 8/54; G06F 12/0246; G06F 2212/2022; G06F 2212/7211; Y02D 10/00
  See application file for complete search history.

(56) References Cited

U.S. PATENT DOCUMENTS

| | | | | |
|---|---|---|---|---|
| 9,974,492 | B1* | 5/2018 | Dicks | G16H 40/63 |
| 2003/0028733 | A1* | 2/2003 | Tsunoda | G06F 12/08 |
| | | | | 711/154 |
| 2005/0010911 | A1* | 1/2005 | Kim | G06F 8/54 |
| | | | | 717/140 |
| 2006/0179082 | A1* | 8/2006 | Boyd | G06F 11/1662 |
| 2006/0277541 | A1* | 12/2006 | Sproul | G06F 9/44557 |
| | | | | 717/174 |
| 2009/0276564 | A1* | 11/2009 | Wong | G06F 12/0246 |
| | | | | 711/109 |
| 2012/0209895 | A1* | 8/2012 | He | G06F 8/54 |
| | | | | 707/825 |
| 2012/0222010 | A1* | 8/2012 | Wu | G06F 9/44521 |
| | | | | 717/124 |
| 2013/0275688 | A1* | 10/2013 | Luo | G06F 8/44 |
| | | | | 711/154 |
| 2015/0332043 | A1* | 11/2015 | Russello | G06F 21/52 |
| | | | | 726/23 |
| 2017/0031696 | A1* | 2/2017 | Huang | G06F 9/44578 |

FOREIGN PATENT DOCUMENTS

| | | |
|---|---|---|
| CN | 101661397 A | 3/2010 |
| CN | 103377131 A | 10/2013 |
| CN | 105426223 A | 3/2016 |

OTHER PUBLICATIONS

Kim, et al., "LASER: Latency-Aware Segment Relocation for non-volatile memory," Journal of Systems Architecture 61, pp. 367-373 (2015).

Koshy, "Remote incremental linking for energy-efficient reprogramming of sensor networks," Department of Computer Science, University of California Davis, pp. 354-365 (2005).

Park, et al., "Quasistatic shared libraries and XIP of memory footprint reduction in MMU-less embedded systems," ACM Transactions on Embedded Computing Systems, vol. 8, No. 1, Article 6, Dec. 2008, 27 pages.

Zhang, et al., "SecGOT secure clobal offset tables in ELF excutables," Proceedings of the 2nd International Conference on Computer Science and Electronics Engineering (ICCSEE 2013), 4 pages.

International Search Report and Written Opinion dated Oct. 10, 2016 for International Application No. PCT/CN2016/086217, 11 pages.

* cited by examiner

METHOD AND APPARATUS FOR LOADING APPLICATION

CROSS-REFERENCE TO RELATED APPLICATION

This application is the U.S. National Phase Application under 35 U.S.C. § 371 of International Application No. PCT/CN2016/086217, filed Jun. 17, 2016, designating the U.S. and published as WO 2017/107415 A1 on Jun. 29, 2017 which claims the benefit of Chinese Application No. 201510994261.4, filed on Dec. 25, 2015, the contents of which are incorporated herein by reference in their entirety.

TECHNICAL FIELD

The present disclosure relates to the field of computer technology, specifically to the field of application, and more specifically to a method and apparatus for loading an application.

BACKGROUND

When an application is loaded in an embedded system, a commonly used approach is to store the binary code of an executable file in a flash memory and execute instructions directly on the flash memory. During the application loading process, a symbol in an assembly code of the application needs to be relocated so that the symbol will have an absolute address to load the application.

However, when the above approach is used to load the application, every relocation of the symbol will result in a corresponding erase operation for a whole memory block where the symbol locates, thus greatly increasing system overheads and wear of the flash memory.

SUMMARY

The present disclosure provides a method and apparatus for loading an application to solve at least one of the technical problems mentioned in the foregoing Background section.

In a first aspect, the present disclosure provides a method for loading an application, comprising: selecting, in a programmable read-only memory, a storage space for storing a preset data section in an executable file of an application, wherein the preset data section is a data section loaded into, and executed in the programmable read-only memory, when the application is loaded; copying the preset data section to a memory, and relocating the preset data section based on a start address of the storage space; and copying the relocated preset data section to the storage space to load the application.

In a second aspect, the present disclosure provides an apparatus for loading an application, comprising: a selecting unit, configured to select, in a programmable read-only memory, a storage space for storing a preset data section in an executable file of an application, wherein the preset data section is a data section loaded into, and executed in the programmable read-only memory, when the application is loaded; a relocating unit, configured to copy the preset data section to a memory, and relocate the preset data section based on a start address of the storage space; and a loading unit, configured to copy the relocated preset data section to the storage space to load the application.

The method and apparatus for loading an application provided by the present disclosure, by selecting, in a programmable read-only memory, a storage space for storing a preset data section in an executable file of an application, copying the preset data section to a memory and relocating the preset data section based on a start address of the storage space, and copying the relocated preset data section to the storage space. A relocation of a code portion of the executable file in the memory is implemented, and the relocated code portion is then written back into the programmable read-only memory, so that the relocation of the code portion can be completed only by one erase operation for a memory block, thereby reducing system overheads during the application loading process, and reducing wear of the programmable read-only memory.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
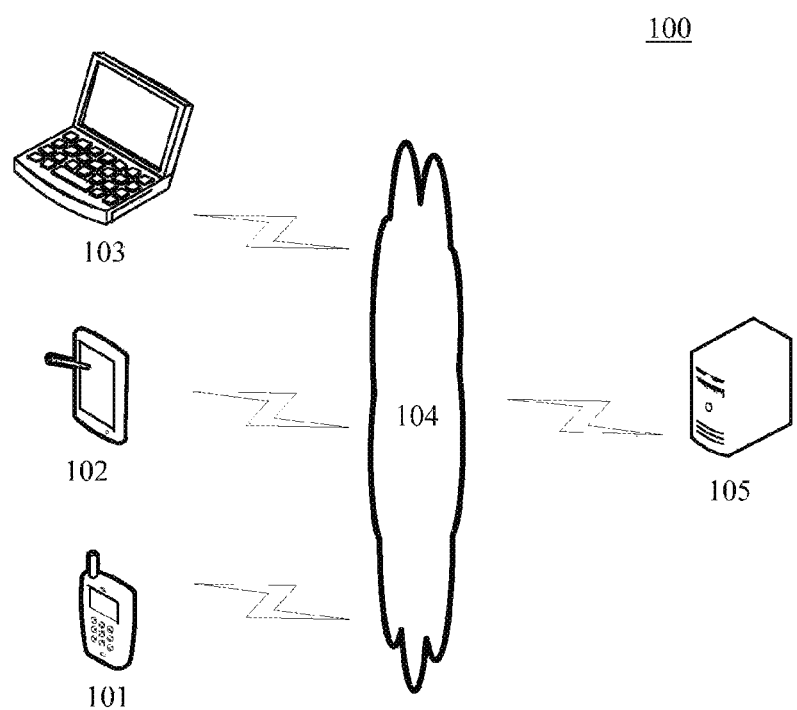
FIG. 1 is an exemplary system architecture diagram in which the present disclosure may be applied.

FIG. 1 shows an exemplary system architecture 100 of an embodiment in which a method and apparatus for loading an application according to the present disclosure may be applied.

As shown in FIG. 1, the system architecture 100 may include terminal devices 101, 102 and 103, a network 104 and a server 105. The network 104 serves as a medium providing a transmission link between the terminal devices 101, 102 and 103 and the server 105. The network 104 may include various types of connections, such as wired or wireless transmission links, or optical fibers.

A user may use the terminal devices 101, 102 and 103 to interact with the server 105 via the network 104 to receive or send messages. Various communication applications, such as network security applications and instant messaging tools, may be installed on the terminal devices 101, 102 and 103.

The terminal devices 101, 102 and 103 may be various electronic devices capable of possessing display screens and supporting network communication, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a server providing data support to the applications on the terminal devices 101, 102 and 103. The server 105 may receive a query request sent from the terminal devices 101, 102 and 103, process the query request, and feed a processed result (relocation information of an executable file of the application) back to the terminal devices.

It should be appreciated that the numbers of the terminal devices, the network and the server in FIG. 1 are merely illustrative. Any number of terminal devices, networks and servers may be provided based on actual requirements.

Figure 2:
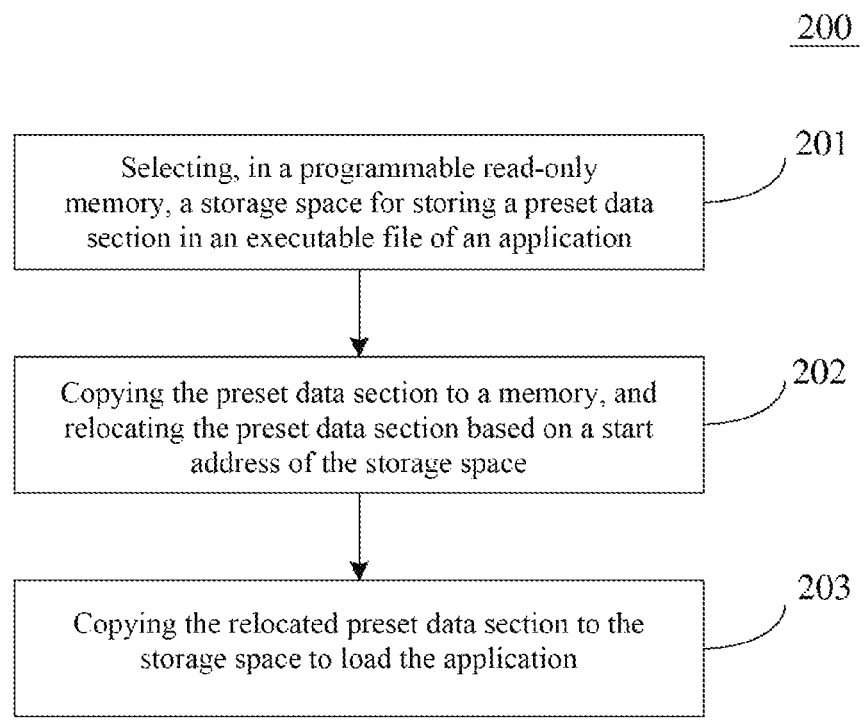
FIG. 2 is a flowchart of an embodiment according to a method for loading an application of the present disclosure.

Referring to FIG. 2, a process 200 of an embodiment of a method for loading an application according to the present disclosure is illustrated. The method for loading an application provided in the embodiment may be performed by the terminal devices 101, 102 and 103 in FIG. 1. This method comprises the following steps.

Step 201, selecting, in a programmable read-only memory, a storage space for storing a preset data section in an executable file of an application.

In this embodiment, the executable file of the application may be stored in the programmable read-only memory. The executable file includes a plurality of data sections. When the application is loaded, that is, when the executable file of the application is loaded, the preset data section is a data section loaded into, and executed in the programmable read-only memory. In this embodiment, the storage space for storing the preset data section may be selected in the programmable read-only memory, and this storage space is used to store a relocated preset data section.

In some alternative implementations of this embodiment, the programmable read-only memory is a flash memory. In this embodiment, the executable file of the application may be stored in the flash memory, and a storage space for storing the relocated preset data section may be preselected in the flash memory.

Step 202, copying the preset data section to a memory, and relocating the preset data section based on a start address of the storage space.

In this embodiment, when the application is loaded, firstly, the preset data section may be copied to the memory, secondly, the preset data section may be relocated based on the start address of the storage space preselected in the programmable read-only memory, that is, a loading address of a symbol in the preset data section may be determined.

By taking assembler instructions jmp exp and exp:push as examples, a principle of relocation will be described below. The assembler instruction exp:push indicates that a PUSH instruction is stored on an address corresponding to the symbol exp. The role of the assembler instruction jmp exp is to jump to the address corresponding to the symbol exp to execute the PUSH instruction on the address. Assuming that a compilation address of the symbol exp is 1000h when compiling, the jmp exp would be translated into jmp 1000h after the assembler instruction is compiled. When the application is loaded, the assembler instructions are compiled with a unified address 0 as the start address during compiling, and may be loaded at any positions to be executed when loaded. Therefore, the symbol needs to be relocated, that is, the loading address (that may also be referred to as an absolute address) corresponding to the symbol in the assembler instructions needs to be redetermined, and the address corresponding to the symbol, that is, the exp symbol, in the assembler instructions needs to be modified to the determined loading address, and thus, the instructions will be executed.

In some alternative implementations of this embodiment, the executable file is an ELF file, the preset data section comprises a data section of machine instructions and a read-only data section, and relocating the preset data section based on a start address of the storage space comprises: searching, in an address offset data section of machine instructions of the ELF file, a first address offset corresponding to an operand of a machine instruction in the data section of machine instructions; calculating a first loading address corresponding to the operand to relocate the data section of machine instructions based on the start address and the first address offset; searching, in an address offset data section of read-only data of the ELF file, a second address offset corresponding to a read-only datum in the read-only data section; and calculating a second loading address corresponding to the read-only datum based on the start address and the second address offset, to relocate the read-only data section.

In this embodiment, to support a loading of the application on an embedded device (e.g., a device of Internet of Things), the executable file may be a file in ELF format which is a relocatable file format (which may be referred to as the ELF file for short). Firstly, the composition of the ELF file is described as follows: in the ELF file, contents of the file are described as data sections. The ELF file comprises: a data section of machine instructions (.text) in which data are machine codes of the compiled application; a read-only data section (.rodata) in which data are read-only data; an initialized global variable data section (.data) in which data are initialized global variables; and an uninitialized global variable data section (.bss). When the executable file of the application is an ELF file, the data section of machine instructions (.text) and read-only data section (.rodata) in the ELF file may be loaded into the flash memory, and the initialized global variable data section (.data) and uninitialized global variable data section (.bss) in the ELF file may be loaded into the memory during the loading of the application, that is, during the loading of the ELF file of the application.

In this embodiment, the data section of machine instructions (.text) and read-only data section (.rodata) may be collectively called a code portion. The initialized global variable data section (.data) and uninitialized global variable data section (.bss) may be collectively called a data portion. When the ELF file is loaded, the code portion and the data portion need to be relocated, that is, the loading addresses of the symbols in the code portion and data portion in the ELF file need to be calculated. In the relocation of the code portion and the data portion, the address offset data section of machine instructions (.rel.text), the address offset data section of read-only data (.rel.rodata), an address offset data section of initialized global variables (.rel.data) in the ELF file may be used to relocate the code and data portions.

In some alternative implementations of this embodiment, the method for loading an application further comprises: copying an uninitialized global variable data section and an initialized global variable data section in the ELF file to the memory; setting a stored value in a storage space corresponding to the uninitialized global variable data section to 0; searching from an address offset data section of initialized global variables in the ELF file for a third address offset corresponding to an initialized global variable in the initialized global variable data section; and calculating a third loading address of the initialized global variable based on a start address of the initialized global variable data section in the memory and the third address offset, to relocate the initialized global variable data section.

The processes of relocation of the code portion and the data portion in the ELF file will be respectively illustrated below with an example of the programmable read-only memory that is the flash memory. In this embodiment, the following approaches may be used to relocate the code portion in the ELF file. Firstly, a storage space of that size to be occupied by the code portion is pre-allocated in the flash memory for the code portion, i.e., the data section of machine instructions (.text) and read-only data section (.rodata), and a start address of this storage space is recorded. Secondly, a storage space of a size equivalent to the above storage space is allocated in the memory, and then the data section of machine instructions (.text) and read-only data section (.rodata) are copied into the memory. In the memory, when the data section of machine instructions (.text) is relocated, a first address offset corresponding to an operand of a machine instruction in the data section of machine instructions, i.e., a symbol referenced in the instruction, may be searched from the address offset data section of machine instructions (.rel.text). Based on the above start address and the first address offset, and then a first loading address of the operand in the instruction, i.e., a first loading address corresponding to the symbol referenced in the instruction will be calculated. After the first loading addresses corresponding to all of the symbols in the machine instructions are calculated, the relocation of the data section of machine instructions will be completed. In the memory, when the read-only data section (.rodata) is relocated, a second address offset corresponding to the read-only data of the read-only data section may be searched from the address offset data section of read-only data (.rel.rodata); and a second loading address corresponding to the read-only data is calculated based on the start address and the second address offset, and thus, the read-only data section will be relocated.

In this embodiment, the following approaches may be used to relocate the data portion in the ELF file. A storage space of that size to be occupied by the initialized global variable data section (.data) and the uninitialized global variable data section (.bss) is allocated in the memory, and the initialized global variable data section (.data) and the uninitialized global variable data section (.bss) are copied into the allocated memory. Values in the storage space in the memory occupied by the uninitialized global variable data section (.bss) are all initialized to 0. Then, a third address offset corresponding to the initialized global variable in the initialized global variable data section may be searched from the address offset data section of initialized global variables (.rel.data). A third loading address of the initialized global variable is calculated based on the start address of the initialized global variable in the memory and the third address offset, and thus, the relocation of the initialized global variable data section (.data) will be performed.

Step 203, copying the relocated preset data section to the storage space to load the application.

In this embodiment, after the relocation of the preset data section (e.g., the data section of machine instructions and the read-only data section) is completed in the memory, the relocated preset data section may be copied back to the storage space for storing the relocated preset data section which is preselected in the programmable read-only memory (e.g., the flash memory), so that the relocated preset data section will be loaded on the programmable read-only memory. Meanwhile, the initialized global variable data section (.data) and the uninitialized global variable data section (.bss) in the memory may be loaded after they are relocated, so that the loading of the application will be completed.

In some alternative implementations of this embodiment, after the relocated preset data section is copied to the storage space, the method for loading an application further comprises: storing the start address of the storage space in the programmable read-only memory, so as to find out the relocated preset data section stored in the programmable read-only memory and load the preset data section by using the start address of the storage space, when the application is loaded again.

In this embodiment, offset and size of each data sections in the ELF file during the relocation process may also be recorded simultaneously. Afterwards, the offset and size of each data sections in the ELF file, the start address of the relocated code portion of the ELF in the flash memory, and a name of the ELF file may be stored together as a file in the flash memory, and this file may be called a relocation information file. Thus, when the application is loaded again, the relocation information file will be found out by the name of the ELF file of the application. After that, data of the data portion in the ELF file may be read directly so as to relocate the data portion and then load it, based on the offset and size of the data portion, that is, the initialized global variable data section (.data) and uninitialized global variable data section (.bss), in the ELF file recorded in the relocation information file.

Figure 3:
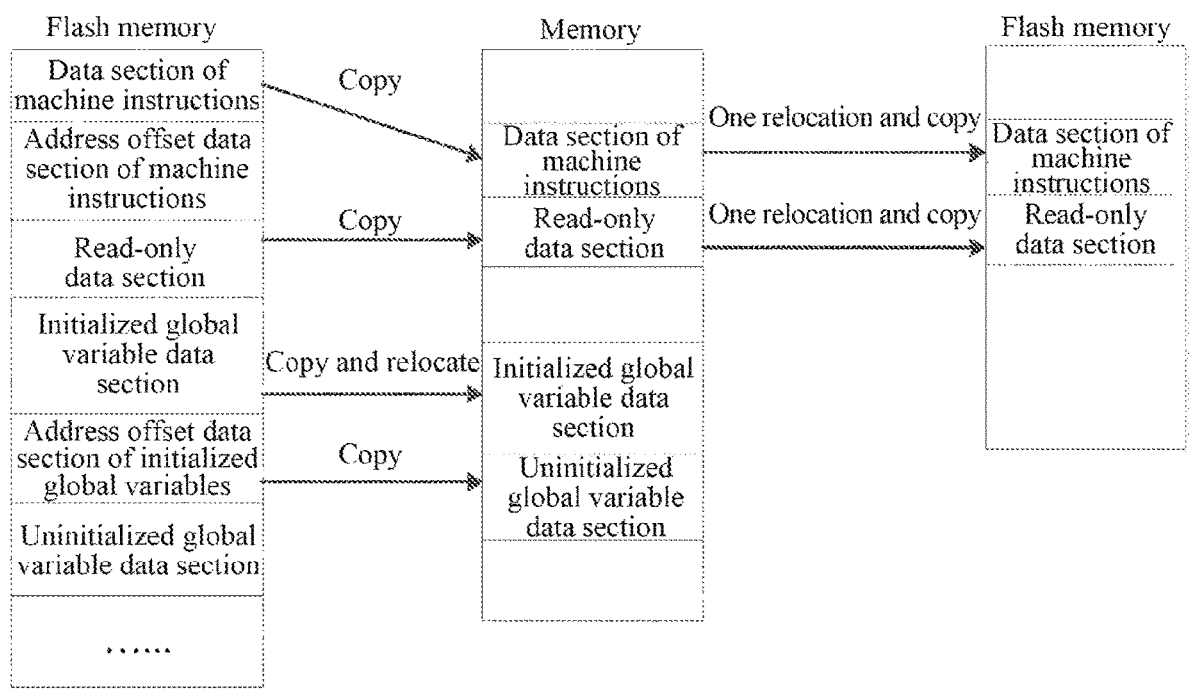
FIG. 3 is an exemplary schematic diagram of loading an application in the embodiment.

Referring to FIG. 3, an exemplary schematic diagram of loading an application in this embodiment is illustrated. In FIG. 3, there illustrates the data section of machine instructions (.text), the address offset data section of machine instructions (.rel.text), the read-only data section (.rodata), the initialized global variable data section (.data), the address offset data section of initialized global variables (.rel.data) and the uninitialized global variable data section (.bss) in the ELF file stored in the flash memory. The data section of machine instructions (.text), the read-only data section (.rodata), the initialized global variable data section (.data) and the uninitialized global variable data section (.bss) are firstly copied to the memory, and meanwhile, a storage space for storing the relocated data section of machine instructions (.text) and read-only data section (.rodata) is selected in the flash memory. This storage space is different from the current storage space for storing the preset data section in the flash memory, and the role of this storage space is to store the relocated preset data section. Then, in the memory, the data section of machine instructions (.text) and read-only data section (.rodata) are relocated based on a start address of this storage space in view of the address offset data section of machine instructions (.rel.text) and address offset data section of read-only data (.rel.rodata), and finally, upon one copy, are written back to the storage space selected in the flash memory for storing the relocated the data section of machine instructions (.text) and read-only data section (.rodata). Meanwhile, the uninitialized global variable data section (.bss) is initialized to 0, and the initialized global variable data section (.data) is relocated in view of the address offset data section of initialized global variables (.rel.data).

Figure 4:
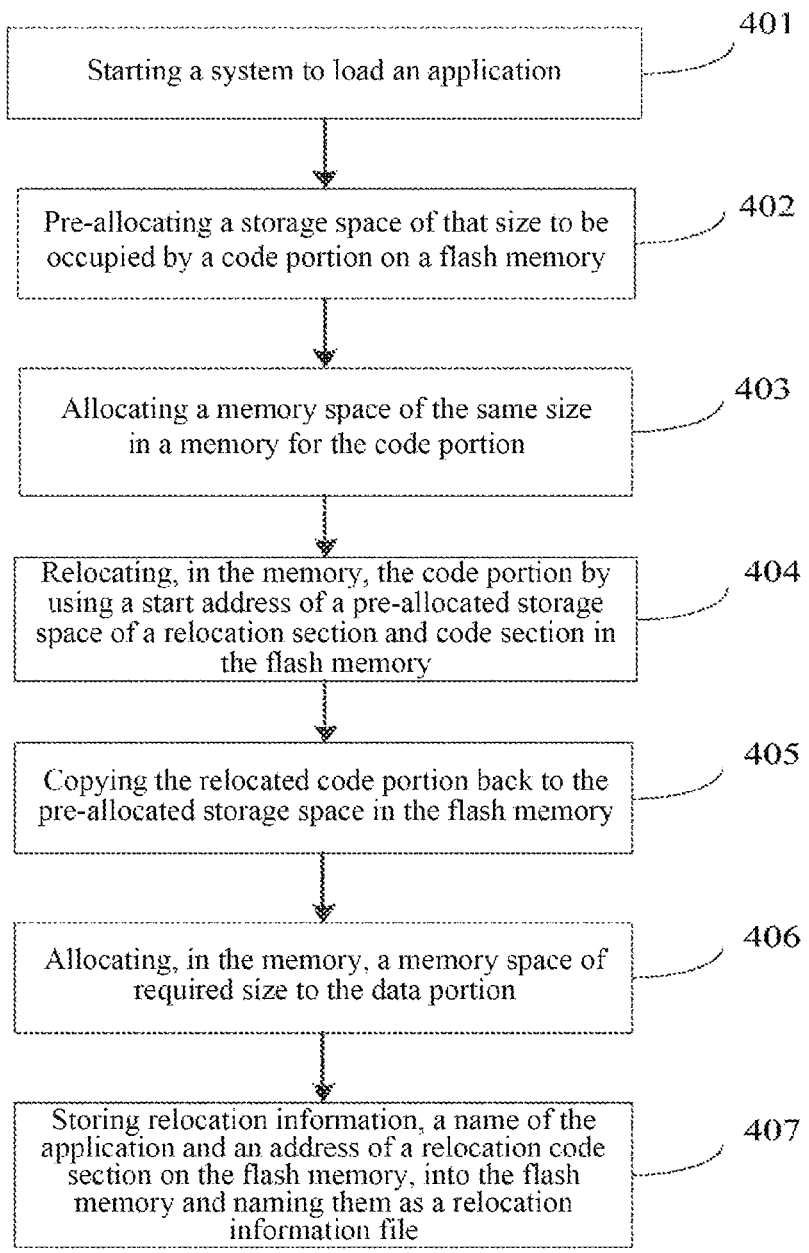
FIG. 4 is an exemplary flowchart of a method for loading an application in the present disclosure.

Referring to FIG. 4, an exemplary flowchart of a method for loading an application in the present disclosure is illustrated. The method comprises the following steps:

step 401, starting a system to load an application, step 402, pre-allocating a storage space of that size to be occupied by a code portion on a flash memory, step 403, allocating a memory space of the same size in a memory for the code portion, step 404, relocating, in the memory, the code portion by using a start address of a pre-allocated storage space of a relocation section and code section in the flash memory, the relocation section comprises an address offset data section of machine instructions and an address offset data section of read-only data, step 405, copying the relocated code portion back to the pre-allocated storage space in the flash memory, step 406, allocating, in the memory, a memory space of required size to the data portion, step 407, storing relocation information, a name of the application and an address of the relocated code section on the flash memory, into the flash memory and naming them as a relocation information file, the relocation information comprises the start address of the pre-allocated storage space in the flash memory.

Differences between the mode of loading an application in this embodiment and the prior art will be illustrated below with an example in which a programmable read-only memory is a flash memory. In the prior art, during the process of relocating a code portion of an application, every relocation of a symbol needs an erase operation for a memory block in the flash memory where the symbol locates, thereby causing an increase of system overheads and wear of flash memory. However, in this embodiment, the code portion of the application only needs to be loaded once at the first loading. When the application is loaded again, for example, when the system reboots, the start address of the relocated code portion of the ELF file stored in the flash memory during the first loading has been pre-stored in the flash memory, and thus, based on this start address, the relocated code portion of the ELF file can be executed directly, and the loading of the code portion of the ELF can be completed directly without a second relocation of the code portion of the ELF file. Meanwhile, the loading of the application can be completed by simply relocating and loading the data portion of the ELF file, thus reducing wear of the flash memory during the application loading process, and improving the application loading speed. Furthermore, data in the data portion of the ELF file may be read directly based on the offset and size of the data portion in the ELF file recoded in the relocation information file without reacquiring aided relocation information, thereby further improving the application loading speed.

Figure 5:
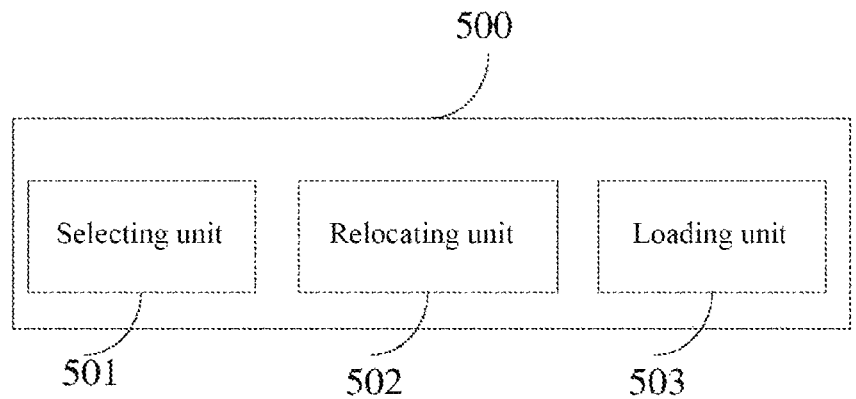
FIG. 5 is a schematic structural diagram of an embodiment of an apparatus for loading an application according to the present disclosure.

Referring to FIG. 5, a schematic structural diagram of an embodiment of an apparatus for loading an application according to the present disclosure is illustrated. The apparatus 500 comprises a selecting unit 501, a relocating unit 502 and a loading unit 503. The selecting unit 501 is configured to select, in a programmable read-only memory, a storage space for storing a preset data section in an executable file of an application, wherein the preset data section is a data section loaded into, and executed in the programmable read-only memory, when the application is loaded. The relocating unit 502 is configured to copy the preset data section to a memory, and relocate the preset data section based on a start address of the storage space. The loading unit 503 is configured to copy the relocated preset data section to the storage space to load the application.

In this embodiment, the selecting unit 501 may select, in the programmable read-only memory, a storage space for storing the relocated preset data section, which has a different address from current storage space in the programmable read-only memory where the preset data section is located.

In this embodiment, the relocating unit 502 may copy the preset data section stored in the programmable read-only memory to the memory, and then, may relocate the preset data section based on the start address of the storage space preselected in the programmable read-only memory, i.e., may determine a loading address of a symbol in an instruction in the preset data section, and a loading address of data in the preset data section.

In this embodiment, the loading unit 503 may copy the relocated preset data section back to the storage space for storing the relocated preset data section which is preselected in the programmable read-only memory, so that the relocated preset data section is loaded on the programmable read-only memory, and meanwhile, may relocate and load an initialized global variable data section and uninitialized global variable data section in the memory so as to complete the loading of the application.

In some alternative implementations of this embodiment, the programmable read-only memory is a flash memory.

In some alternative implementations of this embodiment, the relocating unit 502 comprises: a first searching subunit (unshown), when the executable file is an ELF file and the preset data section comprises a data section of machine instructions and a read-only data section, configured to search, in an address offset data section of machine instructions of the ELF file, a first address offset corresponding to an operand of a machine instruction in the data section of machine instructions; a first calculating subunit (unshown), configured to calculate a first loading address corresponding to the operand to relocate the data section of machine instructions based on the start address and the first address offset; a second searching subunit (unshown), configured to search, in an address offset data section of read-only data of the ELF file, a second address offset corresponding to read-only data in the read-only data section; and a second calculating subunit (unshown), configured to calculate a second loading address corresponding to the read-only data to relocate the read-only data section based on the start address and the second address offset.

In some alternative implementations of this embodiment, the apparatus 500 further comprises: a copying unit (unshown), configured to copy an uninitialized global variable data section and an initialized global variable data section in the ELF file to the memory; a setting unit (unshown), configured to set a stored value in the storage space corresponding to the uninitialized global variable data section to 0; an offset searching unit (unshown), configured to search from an address offset data section of initialized global variables in the ELF file for a third address offset corresponding to an initialized global variable in the initialized global variable data section; and a loading address calculating unit (unshown), configured to calculate a third loading address of the initialized global variable to relocate the initialized global variable data section, based on a start address of the initialized global variable data section in the memory and the third address offset.

In some alternative implementations of this embodiment, the apparatus 500 further comprises a storing unit (unshown), configured to save the start address of the storage space in the programmable read-only memory after the relocated preset data section is copied to the storage space, so as to search for the relocated preset data section stored in the programmable read-only memory and load the preset data section by using the start address of the storage space, when the application is loaded again.

Figure 6:
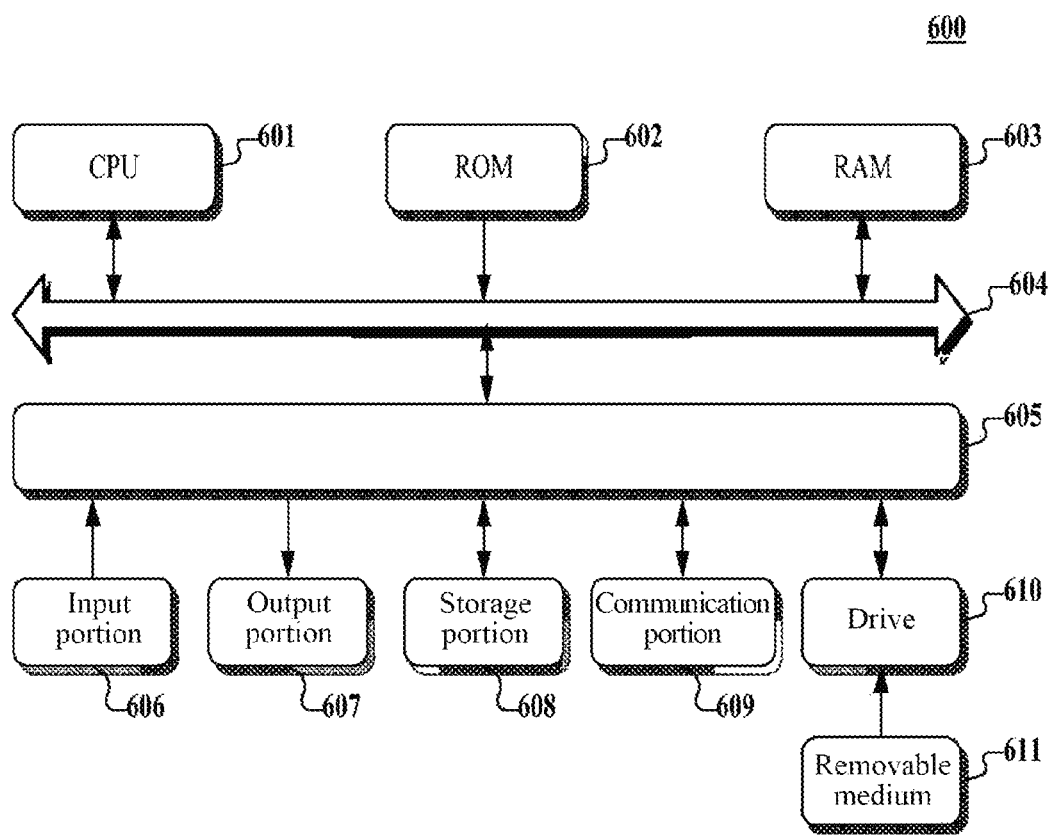
FIG. 6 is a schematic structural diagram of a computer system adapted to implement a terminal device or a server according to embodiments of the present disclosure.

FIG. 6 is a schematic structural diagram of a computer system adapted to implement a terminal device or a server according to embodiments of the present disclosure.

As shown in FIG. 6, the computer system 600 comprises a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 comprising a keyboard, a mouse etc.; an output portion 607 comprising a cathode ray tube (CRT), a liquid crystal display device (LCD), a speaker etc.; a storage portion 608 comprising a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure comprises a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: select, in a programmable read-only memory, a storage space for storing a preset data section in an executable file of an application, wherein the preset data section is a data section loaded into, and executed in the programmable read-only memory, when the application is loaded; copy the preset data section to a memory, and relocate the preset data section based on a start address of the storage space; copying the relocated preset data section to the storage space to load the application.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for loading an application, comprising:
  selecting, in a flash memory, a storage space for storing a preset data section in an executable file of an application, wherein the preset data section is a data section first loaded into and executed in the flash memory responsive to the application being loaded;
  identifying the preset data section stored in the flash memory, wherein the preset data section includes a data section of machine instructions, an address offset data section of machine instructions, a read-only data section, an initialized global variable data section, an address offset data section of initialized global variables, and an uninitialized global variable data section;
  copying a portion of the preset data section from the flash memory to a memory, wherein the portion comprises the data section of machine instructions, the read only data section, the initialized global variable data section, and the uninitialized global variable data section, and relocating a subportion of the portion of the preset data section based on a start address of the storage space in the flash memory, wherein relocating comprises determining a location for the subportion;
  copying the subportion of the portion of the relocated preset data section to the storage space of the flash memory to load and execute the application in the flash memory, wherein the subportion of the portion of the relocated preset data section comprises the data section of machine instructions and the read-only data section, wherein the storage space of the flash memory is different than the store location of the corresponding data in the flash memory before the copying of the portion of the preset data section; and
  storing the start address of a relocated code portion of the preset data section stored in the flash memory during the first loading of the preset data section into the flash memory, wherein the start address of the relocated code portion in the flash memory is associated with the start address of the storage space of the flash memory and is used to determine the relocated code portion of the preset data section of the executable file of the application stored in the flash memory and load the relocated code portion of the preset data section by using the start address of the storage space of the flash memory without a second relocation of the relocated code portion of the preset data section responsive to the application being subsequently loaded and executed in the flash memory.

2. The method according to claim 1, wherein the executable file is an ELF file, and the relocating the preset data section based on the start address of the storage space comprises:

searching, in the address offset data section of machine instructions of the ELF file, a first address offset corresponding to an operand of a machine instruction in the data section of machine instructions;

calculating a first loading address corresponding to the operand to relocate the data section of machine instructions based on the start address and the first address offset;

searching, in an address offset data section of read-only data of the ELF file, a second address offset corresponding to read-only data in the read-only data section; and calculating a second loading address corresponding to the read-only data to relocate the read-only data section based on the start address and the second address offset.

3. The method according to claim 2, further comprising:

copying the uninitialized global variable data section and an initialized global variable data section in the ELF file to the memory;

setting a stored value in a storage space corresponding to the uninitialized global variable data section to 0;

searching from the address offset data section of initialized global variables in the ELF file for a third address offset corresponding to an initialized global variable in the initialized global variable data section; and calculating a third loading address of the initialized global variable to relocate the initialized global variable data section, based on a start address of the initialized global variable data section in the memory and the third address offset.

4. An apparatus for loading an application, comprising:

at least one processor; and a memory storing instructions, which when executed by the at least one processor, cause the at least one processor to perform operations, the operations comprising:

selecting, in a flash memory, a storage space for storing a preset data section in an executable file of an application, wherein the preset data section is a data section first loaded into, and executed in the flash memory responsive to the application being loaded;

identifying the preset data section stored in the flash memory, wherein the preset data section includes a data section of machine instructions, an address offset data section of machine instructions, a read-only data section, an initialized global variable data section, an address offset data section of initialized global variables, and an uninitialized global variable data section;

copying a portion of the preset data section from the flash memory to a memory, wherein the portion comprises the data section of machine instructions, the read only data section, the initialized global variable data section, and the uninitialized global variable data section, and relocating a subportion of the portion of the preset data section based on a start address of the storage space in the flash memory, wherein relocating comprises determining a location for the subportion;

copying the subportion of the portion of the relocated preset data section to the storage space of the flash memory to load and execute the application in the flash memory, wherein the subportion of the portion of the relocated preset data section comprises the data section of machine instructions and the read-only data section, wherein the storage space of the flash memory is different than the store location of the corresponding data in the flash memory before the copying of the portion of the preset data section; and storing the start address of a relocated code portion of the preset data section stored in the flash memory during the first loading of the preset data section into the flash memory, wherein the start address of the relocated code portion in the flash memory is associated with the start address of the storage space of the flash memory and is used to determine the relocated code portion of the preset data section of the executable file of the application stored in the flash memory and load the relocated code portion of the preset data section by using the start address of the storage space of the flash memory without a second relocation of the relocated code portion of the preset data section responsive to the application being subsequently loaded and executed in the flash memory.

5. The apparatus according to claim 4, wherein the executable file is an ELF file, and the relocating the preset data section based on the start address of the storage space comprises:

searching, in the address offset data section of machine instructions of the ELF file, a first address offset corresponding to an operand of a machine instruction in the data section of machine instructions;

calculating a first loading address corresponding to the operand to relocate the data section of machine instructions based on the start address and the first address offset;

searching, in an address offset data section of read-only data of the ELF file, a second address offset corresponding to read-only data in the read-only data section; and calculating a second loading address corresponding to the read-only data to relocate the read-only data section based on the start address and the second address offset.

6. The apparatus according to claim 5, wherein the operations further comprise:

copying the uninitialized global variable data section and an initialized global variable data section in the ELF file to the memory;

setting a stored value in a storage space corresponding to the uninitialized global variable data section to 0;

searching from the address offset data section of initialized global variables in the ELF file for a third address offset corresponding to an initialized global variable in the initialized global variable data section; and calculating a third loading address of the initialized global variable to relocate the initialized global variable data section, based on a start address of the initialized global variable data section in the memory and the third address offset.

7. A non-transitory computer storage medium storing computer readable instructions executable by a processor, the instructions, when executed by the processor, causing the processor to perform a method for loading an application, comprising:

selecting, in a flash memory, a storage space for storing a preset data section in an executable file of an application, wherein the preset data section is a data section first loaded into, and executed in the flash memory responsive to the application being loaded;

identifying the preset data section stored in the flash memory, wherein the preset data section includes a data section of machine instructions, an address offset data section of machine instructions, a read-only data section, an initialized global variable data section, an address offset data section of initialized global variables, and an uninitialized global variable data section;

copying a portion of the preset data section from the flash memory to a memory, wherein the portion comprises the data section of machine instructions, the read only data section, the initialized global variable data section, and the uninitialized global variable data section, and relocating a subportion of the portion of the preset data section based on a start address of the storage space in the flash memory, wherein relocating comprises determining a location for the subportion;

copying the subportion of the portion of the relocated preset data section to the storage space of the flash memory to load and execute the application in the flash memory, wherein the subportion of the portion of the relocated preset data section comprises the data section of of machine instructions and the read-only data section, wherein the storage space of the flash memory is different than the store location of the corresponding data in the flash memory before the copying of the portion of the preset data section; and storing the start address of a relocated code portion of the preset data section stored in the flash memory during the first loading of the preset data section into the flash memory, wherein the start address of the relocated code portion in the flash memory is associated with the start address of the storage space of the flash memory and is used to determine the relocated code portion of the preset data section of the executable file of the application stored in the flash memory and load the relocated code portion of the preset data section by using the start address of the storage space of the flash memory without a second relocation of the relocated code portion of the preset data section responsive to the application being subsequently loaded and executed in the flash memory.

\* \* \* \* \*